US008706489B2

(12) United States Patent
Shen et al.

(10) Patent No.: US 8,706,489 B2
(45) Date of Patent: Apr. 22, 2014

(54) SYSTEM AND METHOD FOR SELECTING AUDIO CONTENTS BY USING SPEECH RECOGNITION

(75) Inventors: Jia-lin Shen, Lujhou (TW); Chien-Chou Hung, Danshuei Township (TW)

(73) Assignee: Delta Electronics Inc., Taoyuan Hsien (TW)

( * ) Notice: Subject to any disclaimer, the term of this patent is extended or adjusted under 35 U.S.C. 154(b) by 2069 days.

(21) Appl. No.: 11/500,770

(22) Filed: Aug. 8, 2006

(65) Prior Publication Data

US 2007/0038446 A1  Feb. 15, 2007

(30) Foreign Application Priority Data

Aug. 9, 2005  (TW) .............................. 94127016 A

(51) Int. Cl.

| | |
|---|---|
| *G06F 17/20* | (2006.01) |
| *G10L 21/00* | (2013.01) |
| *G10L 15/00* | (2013.01) |
| *G10L 15/14* | (2006.01) |
| *G10L 13/00* | (2006.01) |
| *H04M 1/64* | (2006.01) |
| *H04M 11/00* | (2006.01) |

(52) U.S. Cl.
USPC ............... 704/251; 704/1; 704/231; 704/236; 704/241; 704/252; 704/254; 704/256; 704/257; 704/270; 704/275; 704/258; 704/261; 379/88.01; 379/88.16

(58) Field of Classification Search
USPC ................. 704/231, 236, 241, 251, 252, 254, 704/256.1, 257, 270, 275, 258, 261, 1; 379/88.01, 88.16
See application file for complete search history.

(56) References Cited

U.S. PATENT DOCUMENTS

| 6,243,676 | B1 * | 6/2001 | Witteman ...................... 704/243 |
|---|---|---|---|
| 6,278,772 | B1 * | 8/2001 | Bowater et al. ............ 379/88.13 |
| 6,347,299 | B1 * | 2/2002 | Holzman et al. .............. 704/270 |
| 6,356,865 | B1 * | 3/2002 | Franz et al. ....................... 704/2 |
| 6,446,041 | B1 * | 9/2002 | Reynar et al. ................. 704/260 |
| 6,490,553 | B2 * | 12/2002 | Van Thong et al. ........... 704/211 |
| 6,567,506 | B1 * | 5/2003 | Kermani .................... 379/88.01 |
| 6,658,389 | B1 * | 12/2003 | Alpdemir ...................... 704/275 |
| 6,704,708 | B1 * | 3/2004 | Pickering ...................... 704/235 |
| 7,010,485 | B1 * | 3/2006 | Baumgartner et al. ........ 704/251 |
| 7,039,585 | B2 * | 5/2006 | Wilmot et al. ................ 704/235 |
| 7,092,496 | B1 * | 8/2006 | Maes et al. ................. 379/88.01 |
| 7,515,695 | B1 * | 4/2009 | Chan et al. ................. 379/88.18 |
| 7,729,478 | B1 * | 6/2010 | Coughlan et al. .......... 379/88.04 |
| 7,738,637 | B2 * | 6/2010 | Schmandt et al. ......... 379/88.17 |
| 8,233,597 | B2 * | 7/2012 | Kerr et al. .................. 379/88.22 |
| 2001/0021909 | A1 * | 9/2001 | Shimomura et al. .......... 704/275 |
| 2003/0078779 | A1 * | 4/2003 | Desai et al. .................... 704/257 |
| 2004/0117188 | A1 * | 6/2004 | Kiecza et al. ................ 704/270.1 |
| 2005/0021331 | A1 * | 1/2005 | Huang et al. .................. 704/231 |
| 2005/0043953 | A1 * | 2/2005 | Winterkamp et al. ......... 704/275 |
| 2005/0075881 | A1 * | 4/2005 | Rigazio et al. ................ 704/270 |
| 2005/0129188 | A1 * | 6/2005 | Lee et al. .................... 379/88.01 |
| 2005/0143999 | A1 * | 6/2005 | Ichimura ....................... 704/251 |
| 2007/0136067 | A1 * | 6/2007 | Scholl ........................... 704/270 |
| 2008/0059188 | A1 * | 3/2008 | Konopka et al. .............. 704/257 |

\* cited by examiner

*Primary Examiner* — Paras D Shah
(74) *Attorney, Agent, or Firm* — The Webb Law Firm

(57) ABSTRACT

A system and method for selecting audio contents by using the speech recognition to obtain a textual phrase from a series of audio contents are provided. The system includes an output module outputting the audio contents, an input module receiving a speech input from a user, a buffer temporarily storing the audio contents within a desired period and the speech input, and a recognizing module performing a speech recognition between the audio contents within the desired period and the speech input to generate an audio phrase and the corresponding textual phrase matching with the speech input.

9 Claims, 3 Drawing Sheets

SYSTEM AND METHOD FOR SELECTING AUDIO CONTENTS BY USING SPEECH RECOGNITION

FIELD OF THE INVENTION

The present invention is related to a system and method for selecting audio contents, and more particularly to a system and method for selecting audio contents by using the speech recognition to obtain a textual phrase from a series of audio contents, thereby performing further subsequent steps.

BACKGROUND OF THE INVENTION

Nowadays, textual contents are the most general information representation and usually include some crucial or key phrases therein. These key phrases can be highlighted by a mark for selecting and the mark can be an inverse video, an underline mark, a quotation mark, different colors or different fonts for the key phrase. Besides, the key phrases can also be marked by using various input tools, such as a keyboard, a mouse or an input pen. Further, the selected key phrases can be used for an advanced search or a keyword index. For example, the key phrase in a web page of a web site can include a hyperlink for connecting other web pages, or the key phrase in the web page may be marked by using the mouse and then pasted on various search engines on the Internet for searing the relevant articles.

Most types of information representations belong to textual contents with "sighting", and only fewer types of information representations belong to audio contents with "hearing". Recently, the mobile devices are becoming more and more popular. Further, it is better to "hear" messages in the mobile device than "sight" messages since the mobile device includes a smaller monitor. Moreover, there exist advanced techniques with the Bluetooth and wireless networks. Therefore, more and more information representations include audio contents with "hearing", and thus how to select a key phrase from the audio contents will be a problem to be solved.

Besides, the textual contents with "sighting" are a parallel representation to express the information contents therein, and the audio contents with "hearing" are a sequential representation to express the information contents therein. Therefore, the key phrase can not be selected by using the exiting selecting procedures for the textual contents, such as the hyperlink or marking the key phrase with the mouse, to be suitable for the audio contents. Accordingly, how the user could efficiently interact with the audio contents has become an immediate requirement.

Therefore, the purpose of the present invention is to develop a system and method for selecting audio contents by using the speech recognition to deal with the above situations encountered in the prior art.

SUMMARY OF THE INVENTION

It is therefore a first aspect of the present invention to provide a system and method for selecting specific audio contents from a series of audio contents by using the existing speech recognition technique to efficiently obtain an audio phrase from the audio contents being a key phrase corresponding to a speech input from the user.

It is therefore a second aspect of the present invention to provide a system and method for selecting audio contents by using a speech recognition between the audio contents within a desired period and a speech input after playing a series of audio contents to generate a specific textual phrase from the audio contents within the desired period, thereby performing further subsequent steps.

According to a third aspect of the present invention, a system for obtaining a textual phrase from a series of audio contents is provided. The system includes an output module outputting the audio contents, an input module receiving a speech input from a user, a buffer temporarily storing the audio contents within a desired period and the speech input, and a recognizing module performing a speech recognition between the audio contents within the desired period and the speech input to generate an audio phrase and the corresponding textual phrase matching with the speech input.

Preferably, the system further includes a source database including a plurality of textual contents, and a converting module is connected between the source database and the output module and is used for retrieving one of the plurality of textual contents from the source database and converting the retrieved textual contents into the audio contents to be outputted via the output module.

Preferably, the system further includes a source database including a plurality of textual contents and a plurality of audio data, and the output module is used for retrieving one of the plurality of audio data from the source database to output the audio contents.

Preferably, the audio contents within the desired period are the audio contents within a prior period of time outputted by the output module at a moment for the speech input being received by the input module, in which the prior period of time could be 20 seconds.

Preferably, the textual phrase is processed in an advance search system including a retrieval module for retrieving additional contents and speech information corresponding to the textual phrase.

Preferably, the textual phrase is processed in one selected from the group consisting of a speech dialogue system, a keyword index system and an operating system.

According to a fourth aspect of the present invention, a system for obtaining an audio phrase from a series of audio contents including a plurality of audio marks for respectively marking a plurality of key phrases is provided. The system includes an output module outputting the audio contents with the key phrases, an input module receiving a speech input from a user, and a recognizing module performing a speech recognition between the key phrases and the speech input to obtain the audio phrase and the corresponding textual phrase with respect to the speech input from the key phrases.

Preferably, the system further includes a buffer temporarily storing the audio contents within a desired period and the speech input.

Preferably, the recognizing module performs the speech recognition between the key phrases in the buffer and the speech input.

Preferably, the speech recognition is one of a direct acoustic wave recognition and an acoustic model recognition.

Preferably, the acoustic model recognition is one selected from a group consisting of a hidden Markov model (HMM), a neural network, a dynamic time wrapping (DTW) and a template matching.

Preferably, either one of the audio marks is one selected from a group consisting of a playing speed, a tone and a volume to highlight the key phrase therein.

Preferably, either one of the audio marks is a prompting signal to be added to at least one of the key phrase's beginning and end.

According to a fifth aspect of the present invention, a method for obtaining an audio phrase from a series of audio contents is provided. The method includes steps of (a) playing the audio contents, (b) receiving a speech input, (c) performing a speech recognition between the audio contents within a desired period and the speech input, and (d) generating the audio phrase from the audio contents within the desired period to match with the speech input.

Preferably, the audio contents include a plurality of audio marks for respectively marking a plurality of key phrases therein.

Preferably, the step (c) further comprises a step of performing the speech recognition between a number of key phrases in the desired period and the speech input.

Preferably, the step (d) further comprises a step of generating the audio phrase from the number of key phrases to match with the speech input.

Preferably, the speech recognition in the step (c) is performed by one of a direct acoustic wave recognition procedure and an acoustic model recognition procedure.

Preferably, the acoustic model recognition procedure is a recognition procedure selected from a group consisting of a hidden Markov model (HMM), a neural network, a dynamic time wrapping (DTW) and a template matching.

Preferably, the step (d) further comprises a step (d1) of converting the audio phrase into a textual phrase.

Preferably, the textual phrase is further processed by one selected from a group consisting of an advance search step, a keyword index step, a speech dialogue step and an operating step.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENTS

The present invention will now be described more specifically with reference to the following embodiment. It is to be noted that the following descriptions of preferred embodiment of this invention are presented herein for purposes of illustration and description only; it is not intended to be exhaustive or to be limited to the precise form disclosed.

Figure 1A:
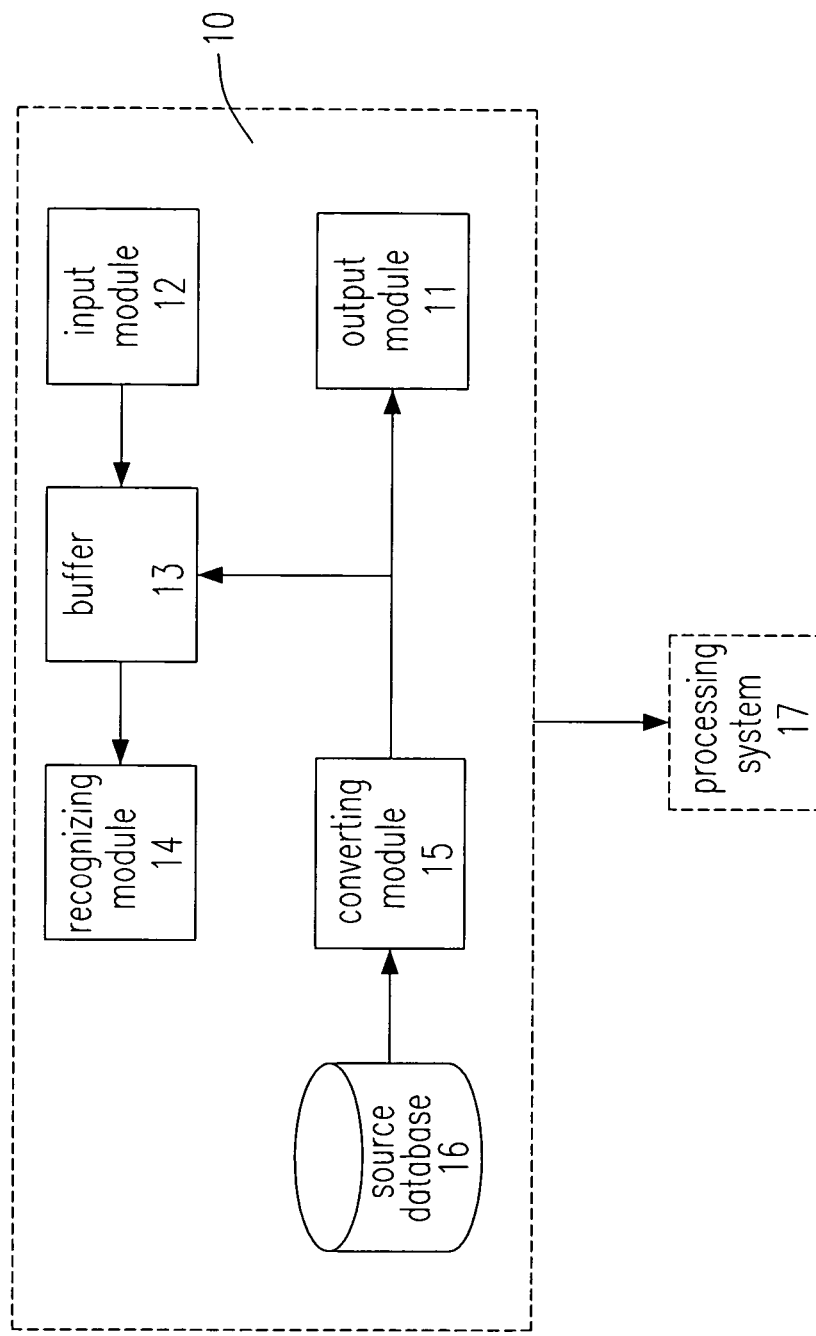
FIG. 1(A) is a schematic view showing a system for selecting audio contents by using the speech recognition according to a first preferred embodiment of the present invention.
Figure 1B:
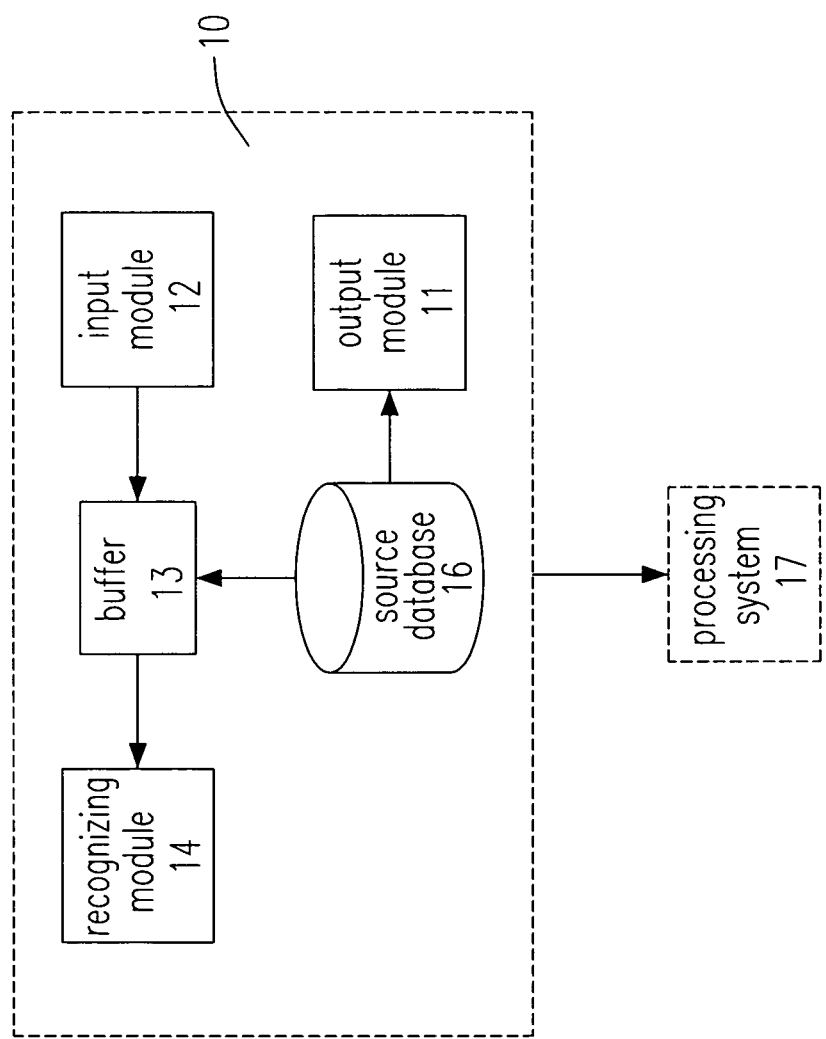
FIG. 1(B) is a schematic view showing a system for selecting audio contents by using the speech recognition according to a second preferred embodiment of the present invention.

Please refer to FIGS. 1(A) and 1(B), which are schematic views showing a system for selecting audio contents by using the speech recognition according to two preferred embodiments of the present invention, in which the same device includes the same reference numerals. The present system 10 includes an output module 11, an input module 12, a buffer 13, a recognizing module 14 and a source database 16, through which an audio phrase is selected from a series of audio contents from the output module 11 to perform a subsequent step on a processing system 17.

The output module 11 is used for outputting the audio contents to be heard by a user in time order and the input module 12 is used for receiving a speech input from the user.

Further, the buffer 13 is used for temporarily storing the audio contents within a desired period and the speech input, and the recognizing module 14 is used for performing a speech recognition between the audio contents within the desired period form the buffer 13 and the speech input from the input module 12 to generate an audio phrase and the corresponding textual phrase matching with the speech input. The source database 16 provides a source of the audio contents for the output module 11.

Furthermore, there are two respective schematic views of the system 10 in FIGS. 1(A) and 1(B) according to the types of information contents being stored in the source database 16.

Please refer to FIG. 1(A), which is a schematic view showing the system 10 according to a first preferred embodiment of the present invention, in which the source database 16 includes a plurality of textual contents. Further, the system 10 further includes a converting module 15 is connected between the source database 16 and the output module 11 and is used for retrieving one of the plurality of textual contents from the source database 16 and converting the retrieved textual contents into the audio contents to be outputted via the output module 11. Moreover, the buffer 13 would store some audio contents output from the source database 16 via the converting module 15.

Besides, while the source database 16 includes a plurality of audio data, there is another preferred embodiment as shown in FIG. 1(B). There does not exist a converting module 15 in the system 10 of FIG. 1(B). The output module 11 is used for retrieving one of the plurality of audio data from the source database 16 to output the audio contents. Further, the buffer 13 would store some audio contents output from the source database 16.

Since the user hears the audio contents in time order, the speech input from the user is a specific audio content at a moment just to be heard. Accordingly, the present invention designs the audio contents within the desired period to be the audio contents within a prior period of time outputted by the output module 11 at a moment for the speech input being received by the input module 12, and the audio contents within the desired period are temporarily stored in the buffer 13. Further, the prior period of time could be 20 seconds or any designated period. Besides, while the speech input from the user is received by the input module 12, the speech input would be stored in the buffer 13. Therefore, the recognizing module 14 would retrieve the audio contents and the speech input stored in the buffer 13 and perform the speech recognition therebetween to generate an audio phrase and the corresponding textual phrase matching with the speech input. Further, the textual phrase is transferred to the processing system 17 to be processed.

Furthermore, the processing system 17 can be a speech dialogue system, a keyword index system, an operating system or an advance search system according to different conditions. For example, the speech dialogue system is used for performing a speech dialogue based on the semantic understanding of the textual phrase. The keyword index system is used for performing a keyword index step with the audio phrase. The operating system is used for operating other procedures through the semantic understanding of the textual phrase. Further, the advance search system is used for retrieving additional contents and speech information corresponding to the textual phrase by a retrieval module (not shown).

In addition, the processing system 17 can be used for performing different subsequent steps. Accordingly, the audio phrase would be provided to perform the keyword index step by the system 10 if the processing system 17 is the keyword index system, and the textual phrase would be provided by the system 10 for further analysis if the processing system 17 is the speech dialogue system, the operating system or the advance search system. Thus, the system 10 can transfer the audio phrase or the textual phrase to the processing system 17 for performing the subsequent steps in accordance with types of the processing system 17. In an actual transfer procedure, the audio phrase can be transferred by the recognizing module 14 if the audio phrase is transferred from the system 10 to the processing system 17. On the contrary, if the textual phrase is transferred from the system 10 to the processing system 17, the converted textual phrase can be transferred to the audio phrase by the converting module 15.

Besides, the speech recognition is one of a direct acoustic wave recognition and an acoustic model recognition. The direct acoustic wave recognition is an audio wave comparison between the audio contents and the speech input in the buffer 13 to generate a most possible audio phrase in the audio contents. The acoustic model recognition is one selected from a group consisting of a hidden Markov model (HMM), a neural network, a dynamic time wrapping (DTW) and a template matching.

Figure 2:
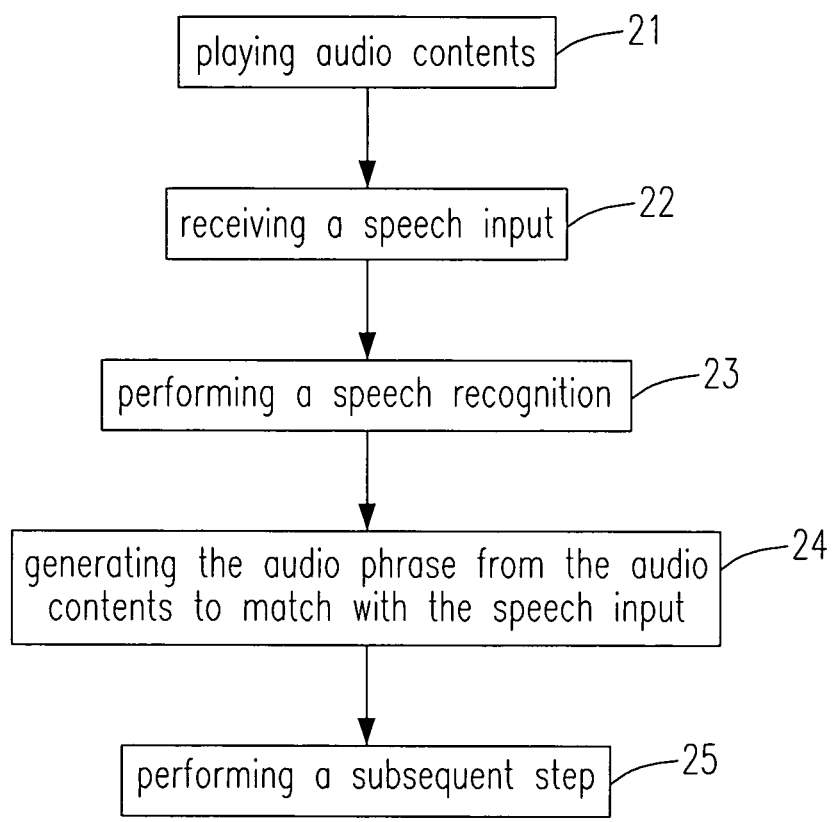
FIG. 2 is a flow chart showing a method for selecting audio contents by using the speech recognition according to a preferred embodiment of the present invention.

Please refer to FIG. 2, which is a flow chart showing a method for selecting audio contents by using the speech recognition according to a preferred embodiment of the present invention. Firstly, the audio contents from the present system are played (step 21), and then a speech input from a user is received (step 22). Then, a speech recognition between the audio contents within a desired period and the speech input is performed (step 23), and the audio phrase from the audio contents within the desired period to match with the speech input is generated (step 24). Further, a subsequent step is performed (step 25) which can be an advance search step, a keyword index step, a speech dialogue step or an operating step. Furthermore, the audio phrase is further converted into a textual phrase while the subsequent step is performed through the textual phrase.

Besides, the present invention provides the audio contents including a plurality of audio marks for respectively marking a plurality of key phrases therein so as to enhance the efficiency for speech recognition. Moreover, either one of the audio marks is one selected from a group consisting of a playing speed, a tone and a volume to highlight the key phrase therein, and either one of the audio marks is a prompting signal to be added to at least one of the key phrase's beginning and end. Therefore, the user can identify which audio contents are the key phrases.

Furthermore, the audio marks can be stored in the source database 16, as shown in FIGS. 1(A) and 1(B). Even if the source database 16 only includes the textual contents or includes the textual contents together with the audio data, the audio contents with the key phrases could be outputted by some simple procedures. The procedures can be performed by directly storing the key phrases with audio marks in the audio data, or directly marking a specific textual phrase of the textual contents with a desired audio mark so as to generate the specific audio mark after converting the textual contents into the audio contents.

Thus, the recognizing module 14 can perform the speech recognition between a number of key phrases in the desired period and the speech input to generate the audio phrase from the number of key phrases to match with the speech input since the buffer 13 temporarily stores the audio contents with the number of key phrases within a desired period and the speech input. Accordingly, the recognizing time will be decreased therewith and the probability for successful recognition will also be increased therewith. However, the present system 10 can be performed without designating the desired period to directly perform the speech recognition between the entire audio contents and the speech input or between the entire key phrases in the audio contents and the speech input.

Therefore, the present system and the present method for selecting audio contents by using the speech recognition can provide a preferred two-way interaction mechanism between the series of audio contents and the user. Further, the present invention provides a convenient tool to actively obtain the desired information contents in the audio contents of the sequential representation, as well as those in the textual contents of the parallel representation. Then, the prior art, in which the user passively hears the audio contents for obtaining the information contents, can be significantly improved.

Accordingly, the present invention can be applied in various interaction equipment for outputting audio contents to transmit its information, such as a mobile device, a Bluetooth device, or an internet access device. The desired audio phrase can be easily selected by using the mechanism in the present invention, thereby performing a further subsequent step without the necessity for training or memorizing specific commands.

According to the above description, it is understood that the present system and the present method for selecting audio contents by using the speech recognition can effectively improve the interactive ability between the user and the audio contents. Furthermore, the present invention can be simply implemented by using the existing speech recognition technique together with the information retrieving procedure and the specific audio marks so as to perform the speech recognition between the audio contents and the speech input from the user to generate a specific key phrase from the audio contents to match with the speech input.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A system for obtaining user-selected audio key phrase from a series of audio contents, comprising:
    an output module outputting the audio contents to a user, wherein the audio contents include a plurality of audio phrases and audio key phrases, wherein the plurality of audio key phrases are highlighted by one selected from the group consisting of a play speed, a tone, a sound volume, and a combination thereof;
    an input module receiving a speech input from the user, wherein the speech input includes the user-selected audio key phrase based on the audio contents being output;
    a buffer temporarily storing a number of outputted audio key phrases within a desired period and the speech input, wherein the desired period is a prior period of time before a moment when the speech input is received by the input module; and
    a recognizing module performing a speech recognition by matching the number of the outputted audio key phrases during the desired period with the speech input, so as to obtain the user-selected audio key phrase.

2. The system according to claim 1, wherein the speech recognition is one of a direct acoustic wave recognition and an acoustic model recognition.

3. The system according to claim 2, wherein the acoustic model recognition is one selected from a group consisting of a hidden Markov model (HMM), a neural network, a dynamic time wrapping (DTW) and a template matching.

4. A method for obtaining a user-selected audio key phrase from an audio content, comprising steps of:
- playing the audio content to a user, wherein the audio content comprises a plurality of audio phrases and audio key phrases, wherein the plurality of audio key phrases are highlighted by one selected from a group consisting of a play speed, a tone, a sound volume and a combination thereof;
- allowing the user to select one from the plurality of audio key phrases by receiving a speech input including the user-selected audio key phrase based on the audio contents being output;
- receiving the speech input from the user;
- a buffer temporarily storing a number of outputted audio key phrases within a desired period and the speech input, wherein the desired period is a prior period of time before a moment when the speech input is received by the input module; and
- performing a speech recognition by matching the number of outputted audio key phrases during the desired period with the speech input, so as to obtain the user-selected audio key phrase.

5. The method according to claim 4, wherein the speech recognition is one of a direct acoustic wave recognition and an acoustic model recognition.

6. The method according to claim 5, wherein the acoustic model recognition is one selected from a group consisting of a hidden Markov model (HMM), a neural network, a dynamic time wrapping (DTW) and a template matching.

7. A method of providing a two-way interaction mechanism to a user for obtaining a textual phrase, comprising steps of:
- playing an audio content to the user, wherein the audio content includes a plurality of audio phrases and audio key phrases, wherein the plurality of audio key phrases are highlighted by one selected from a group consisting of a play speed, a tone, a sound volume and a combination thereof;
- allowing the user to select one from the plurality of audio key phrases by receiving a speech input including the user-selected audio key phrase based on the audio contents being output;
- a buffer temporarily storing a number of outputted audio key phrases within a desired period and the speech input, wherein the desired period is a prior period of time before a moment when the speech input is received by the input module;
- performing a speech recognition by matching the number of outputted audio key phrases during the desired period with the speech input, so as to obtain the user-selected audio key phrase; and
- converting the user-selected audio key phrase into a textual phrase.

8. The method according to claim 7, wherein the speech recognition is one of a direct acoustic wave recognition and an acoustic model recognition.

9. The method according to claim 8, wherein the acoustic model recognition is one selected from a group consisting of a hidden Markov model (HMM), a neural network, a dynamic time wrapping (DTW) and a template matching.

* * * * *